Patented Jan. 2, 1951

2,536,953

UNITED STATES PATENT OFFICE 2,536,953

BOROFLUORIDE BONDED ABRASIVE ARTICLES AND THE MANUFACTURE THEREOF

Pierre Neven, Gloucester, England, assignor to Impregnated Diamond Products Limited, Bath, Somersetshire, England, a company of Great Britain No Drawing. Application March 10, 1949, Serial No. 80,766. In Great Britain April 13, 1948

11 Claims. (Cl. 51—307)

This invention relates to abrasive articles such for example as grinding wheels, milling tools, hones, handlaps and the like and to the manufacture of such articles.

An abrasive article according to the present invention comprises a crystalline abrasive mineral, either natural or manufactured, united with borofluoride of potassium or sodium into a homogeneous mass.

The article may include an additional abrasive in the form of diamond, or diamond, which may be in the form of boart, mixed with boron carbide and silicon carbide.

The process of manufacture of an abrasive article according to this invention consists in mixing the natural or manufactured mineral which is previously crushed, with the borofluoride of potassium or sodium and placing the mixture in a mould in which it is subjected to slight cold pressure and then heated, for example in a furnace, to a temperature above the melting point of the borofluoride employed but below 600° C. for about 30 minutes, then resubjecting to pressure after which the mixture is allowed to cool and then removed from the mould.

As examples of crystalline abrasive minerals which I may employ the following are given: garnet, beryl, topaz, corundum including sapphire, ruby and emery, agate, granite, andalusite, and sillimanite or fused alumina. It is to be understood that the term garnet includes the following minerals:

Lagoriolite, $Na_6Al_2(SiO_4)_3$
Grossular, $Ca_3Al_2(SiO_4)_3$
Pyrope, $Mg_3Al_2(SiO_4)_3$
Almandine, $Fe_3Al_2(SiO_4)_3$
Spessartite, $Mn_3Al_2(SiO_4)_3$
Andradite, $Ca_3Fe_2(SiO_4)_3$
Ouvarovite, $Ca_3Cr_2(SiO_4)_3$
Schorlomite, $Ca_3(FeTi)_2(SiTi)_3O_4$ The proportion of borofluoride of potassium or sodium with respect to the mineral may vary between 6 and 12% and is preferably 10% and when an additional abrasive is added to the mineral this may be within the range of 5–25% with the same quantity of borofluoride. If the additional abrasive consists of a mixture of boart and boron carbide and silicon carbide the mixture is preferably in the proportions of 1:2:2.

In the process of manufacture I have found that it is preferable when the mixture is in the mould to apply pressure in the region of 100 kilogrammes per square centimetre which assists the spreading of the borofluoride throughout the mixture and at the same time the mould is heated to a temperature below 600° C. for 30 minutes.

I have found that by making abrasive articles in this manner and according to the invention a tool with a high degree of hardness can readily be obtained; thus tools incorporating the following minerals I have found to possess the following degrees of hardness:

Garnet, 7–8
Beryl, 7.5–8
Topaz, 8
Corundum, 9
Andalusite, 7.5
Sillimanite, 7.5
Fused alumina, 9

I believe that I am the first to produce abrasive articles of such degrees of hardness at so low a temperature and pressure without utilising a non-oxidising atmosphere.

I claim:

1. A process of manufacture of an abrasive article consisting in mixing a crystalline abrasive mineral with a borofluoride selected from the group consisting of sodium and potassium borofluoride, in an amount to bond the abrasive mineral, subjecting the mixture to cold pressure, then heating the mixture to a temperature above the melting point of the borofluoride but below 600° C., resubjecting to pressure and allowing the mixture to cool.

2. A process of manufacture of an abrasive article consisting in mixing a natural crystalline abrasive mineral with borofluoride of potassium in amount of from 6 to 12% by weight based on the abrasive, subjecting the mixture to cold pressure, heating the mixture to a temperature above the melting point of potassium borofluoride but below 600° C., resubjecting to pressure in the region of 100 kilograms per square centimeter, and allowing to cool.

3. A process of manufacture of an abrasive article consisting in mixing a manufactured crystalline abrasive mineral with borofluoride of potassium in amount of from 6 to 12% by weight based on the abrasive, subjecting the mixture to cold pressure, heating the mixture to a temperature above the melting point of potassium borofluoride but below 600° C., resubjecting to pressure in the region of 100 kilograms per square centimeter, and allowing to cool.

4. A process as claimed in claim 2 in which the abrasive mineral is previously crushed and comprises one of the following minerals: garnet, beryl, topaz, corundum, including sapphire, ruby and emery, agate, granite, andalusite and sillimanite or fused alumina.

5. A process as claimed in claim 3 in which the abrasive mineral is previously crushed and comprises one of the following minerals: garnet, beryl, topaz, corundum, including sapphire, ruby and emery, agate, granite, andalusite and sillimanite or fused alumina.

6. A process as claimed in claim 2 in which an additional abrasive in an amount of from 5 to 25% by weight based on the amount of the first mentioned crystalline abrasive, in the form of diamond mixed with boron and silicon carbide, with the same quantity of potassium borofluoride, is added to the mixture.

7. A process as claimed in claim 3 in which an additional abrasive in an amount of from 5 to 25% by weight based on the amount of the first mentioned crystalline abrasive, in the form of diamond mixed with boron and silicon carbide, with the same quantity of potassium borofluoride, is added to the mixture.

8. An abrasive article comprising a natural crystalline abrasive mineral united with potassium borofluoride into a homogeneous mass according to the process claimed in claim 2.

9. An abrasive article comprising a manufactured crystalline abrasive mineral united with potassium borofluoride into a homogeneous mass according to the process claimed in claim 3.

10. An abrasive article comprising a natural crystalline abrasive mineral united with potassium borofluoride and an additional abrasive comprising diamond and boron and silicon carbide into a homogeneous mass according to the process claimed in claim 2.

11. An abrasive article comprising a manufactured crystalline abrasive mineral united with potassium borofluoride and an additional abrasive comprising diamond and boron and silicon carbide into a homogeneous mass according to the process claimed in claim 3.

PIERRE NEVEN.

REFERENCES CITED

The following references are of record in the file of this patent:

UNITED STATES PATENTS

| Number | Name | Date |
|---|---|---|
| 1,013,657 | Higgins | Jan. 2, 1912 |
| 2,308,983 | Kistler | Jan. 19, 1943 |
| 2,408,319 | Kistler | Sept. 24, 1946 |
| 2,466,706 | Hughes et al. | Apr. 12, 1949 |
| 2,471,130 | Vesterdahl | May 24, 1949 |